United States Patent

[11] 3,552,467

| [72] | Inventor | Emric W. Bergere<br>2324 Nottingham Ave., Los Angeles, Calif. 90027 |
|---|---|---|
| [21] | Appl. No. | 844,955 |
| [22] | Filed | July 25, 1969<br>Continuation-in-part of Ser. No. 731,215, May 22, 1968, now abandoned. |
| [45] | Patented | Jan. 5, 1971 |

[54] SELF-LOCKING FASTENER AND METHOD OF MAKING SAME
14 Claims, 13 Drawing Figs.

[52] U.S. Cl. .................................................. 151/14;
117/5.5, 117/38, 117/131; 118/505
[51] Int. Cl. ..................................................... B05c 1/16,
B05c 3/20, B05c 11/14, B44d 1/52
[50] Field of Search .......................................... 85/10.11-C;
151/14, 14.5, 7, 23—26, 22; 117/5.5, 38, 50, 48, 130, 131, 113; 118/503, 504, 505, 500

[56] References Cited
UNITED STATES PATENTS

| 1,137,941 | 5/1915 | Woodward .................. | 151/14.5 |
| 1,918,441 | 7/1933 | Alsaker ....................... | 85/1-C UX |
| 2,369,671 | 2/1945 | Greenberg et al. ........... | 118/505 |
| 2,685,543 | 8/1954 | Sindeband .................... | 117/5.5X |
| 2,960,417 | 11/1960 | Strother ..................... | 117/5.5X |
| 2,966,429 | 12/1960 | Darrel et al. ................. | 117/5.5X |
| 3,294,139 | 12/1966 | Preziosi ....................... | 151/7 |
| 3,375,178 | 3/1968 | Locke .......................... | 117/130EX |

FOREIGN PATENTS

| 26,071 | 4/1914 | Great Britain ............... | 85/1-C |

Primary Examiner—Ramon S. Britts
Attorney—Smyth, Roston & Pavitt

ABSTRACT: To cause mutual self-locking engagement of a screw member with a complementary nut member, a hard metal plating is deposited on a minor portion of the circumference of the screw thread of one of the two members to force the two members diametrically into eccentric relationship with mutual frictional locking engagement of the two screw threads with each other when the tolerance clearance between the two screw threads is maximum. At substantially lesser clearances, the nut member is elastically deformed elliptically.

PATENTED JAN 5 1971

INVENTOR:
Emric W. Bergere

By Smyth, Roston & Pavitt
ATTORNEYS

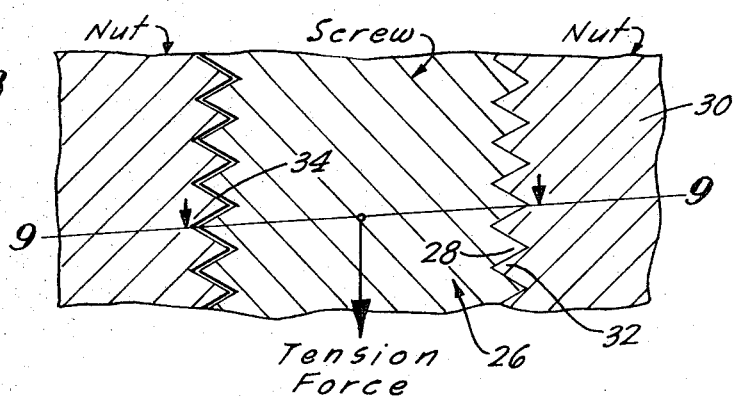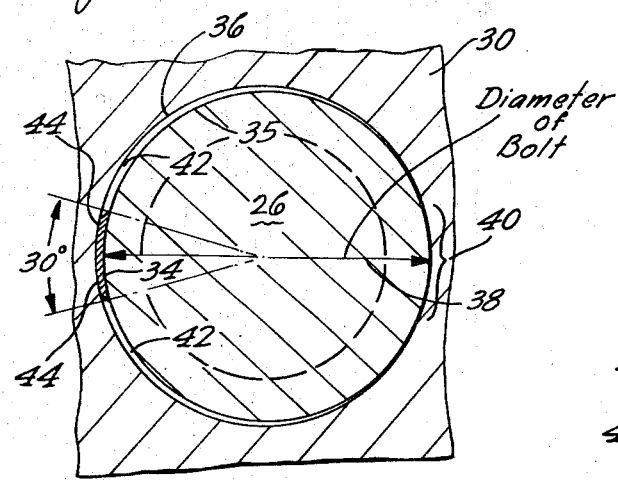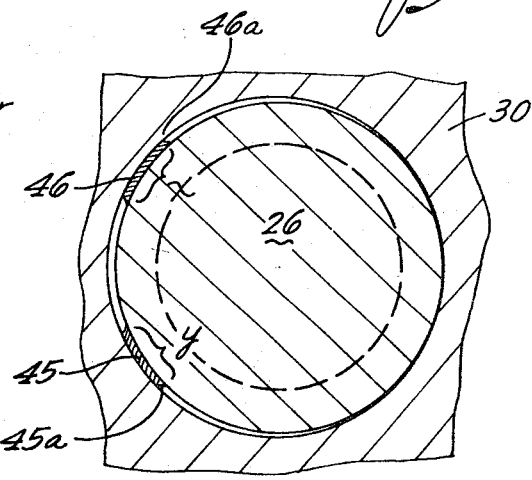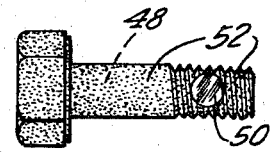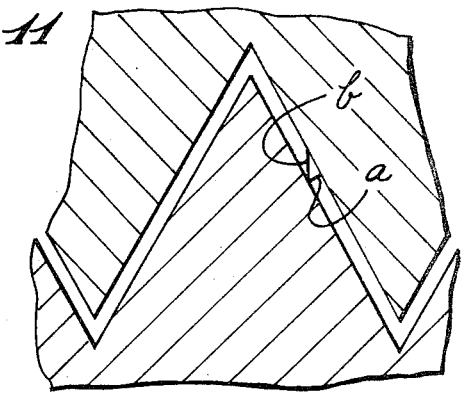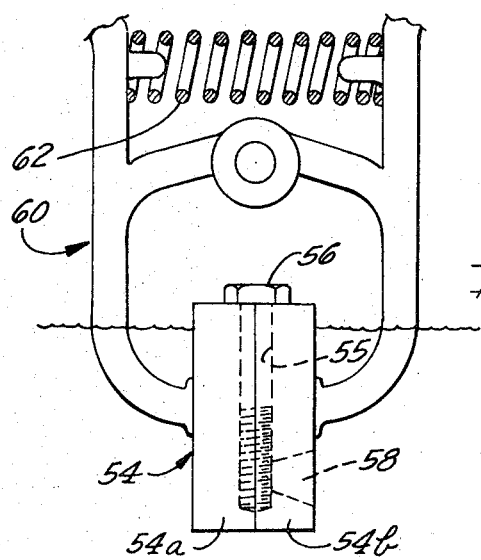

SELF-LOCKING FASTENER AND METHOD OF MAKING SAME

CROSS-REFERENCES TO RELATED APPLICATIONS

This application is a continuation-in-part of my copending application of the same title, Ser. No. 731,215, filed May 22, 1968, now abandoned.

BACKGROUND OF THE INVENTION

BACKGROUND OF THE INVENTION While the invention is broadly applicable to various types of screw-threaded fasteners, it has special utility for screw fasteners that are to be employed in a high-temperature environment, i.e. environment in which the temperature is in the range of 350°—1,600° F. The problem is to provide a self-locking action that will be effective over the expected range of tolerance clearances between the two mating threads with the self-locking action effective throughout the temperature range.

In one type of screw fastener for high temperature use the screw threads are distorted for interference fit and such a screw is satisfactory for a single use but the torque drops off too rapidly in a succession of cycles of reuse because little or no elastic deformation of metal is involved in the self-locking action.

Another type of self-locking action is provided by providing a blind axial bore in the leading end of a screw to make the leading end tubular and by then deforming the tubular end portion of the screw. In one such screw, for example, the tubular end portion is squeezed diametrically beyond its elastic limits to result in an elliptical cross-sectional configuration. Such a screw does have resiliency to make it effective at high temperatures but has the disadvantage of being difficult to start because of its elliptical configuration, and the further disadvantage of being weakened by the axial bore.

In another screw of this same general type, a portion of the tubular end of the screw is expanded in diameter uniformly in a region back of the leading turns of the screw. Such a screw is easy to start and does provide resiliency for self-locking action but the resiliency is limited because the tubular end portion of the screw must be of a unrestrained diameter sufficient to take up the maximum clearance and must yield by radial compression to compensate for lesser clearances. It is inherently more difficult for a concentric tubular member to yield by radial compression than to yield by radial expansion. It is to be further noted that here again the removal of metal to form the tubular configuration seriously weakens the screw.

With the foregoing in mind, the principal object of this invention is to provide a thread lock of general application with simplicity, economy and without requiring structural alteration of the standard thread form.

An important object of the invention is to provide a self-locking action for a screw without weakening the screw by boring the screw or otherwise removing material from the screw.

Another object of the invention is to provide a thread lock which will not distort or mutilate the threaded assembly.

A further object of the invention is to provide an economical method of fabricating a screw that may be depended upon for close dimensional control in mass production.

SUMMARY OF THE INVENTION

For self-locking action between a screw member having an external screw thread and a complementary nut member having an internal screw thread with a given range of tolerance clearance between the two screw threads, the invention teaches the depositing of a metal plating on one of the two screw threads of a circumferential extent of substantially less than 180° to force the two members into eccentric relationship. The plating that is deposited on the one screw thread is of sufficient hardness to be substantially immune to deformation by the complementary screw thread and the plating is of a thickness to compensate for the maximum clearance in the whole range of tolerance clearances thereby to force the two screw threads into mutual contact in a friction locking zone that is diametrically opposite from the region of the deposited plating.

Thus when the clearance is at the maximum in the range of tolerances, the plating patch is of sufficient thickness to produce the required frictional lock between the two threads. If the clearance between the two screw threads is only slightly less than the maximum clearance compensation for this fact is provided at least in part, by mutual frictional polishing or lapping of the two screw threads.

If the clearance between the two mating screw threads is substantially less than the theoretical maximum clearance or is even zero, compensation for this fact is provided by elastic deformation of the nut to an elliptical configuration with the major axis of the ellipse intersecting the patch. Thus a basic feature of the invention is the concept of taking advantage of the inherent elasticity of a nut whereby the screw utilizes the elasticity of the nut for the self-locking action. It is to be noted that the nut is required to expand elastically and as heretofore noted any tubular member has greater elasticity for radial expansion than for radial compression. In this regard an important feature of the invention is that the plating patch forces the screw and nut into an eccentric relationship that provides clearance between the screw and the nut on opposite sides of the plating patch and these two clearances permit radially inward distortion of the nut. —

BRIEF DESCRIPTION OF THE DRAWINGS

In the drawings, which are to be regarded as merely illustrative:

FIG. 8 is a greatly enlarged longitudinal section of a screw and a mating nut with a plating patch on the screw;

FIG. 9 is a diagram based on a transverse section along the line 9–9 of FIG. 8;

FIG. 10 is a similar diagram showing how a screw may be provided with two circumferentially spaced plating patches;

FIG. 11 is a diagram illustrating the fact that a plating patch of a given thickness has a relatively large effect on the clearance between a screw and a nut;

FIG. 12 is an elevational view of a screw that is encased in a resist coat except for an adhesive disc on a minor portion of the screw thread of the screw; and FIG. 13 is an elevational view of a fixture for holding a number of screws in a plating bath.

DESCRIPTION OF THE PREFERRED EMBODIMENTS OF THE INVENTION

The required metal plating to form a locking patch on a bolt may be applied by any suitable process. For example, the conventional electrolytic process of depositing nickel may be used. Nickel is highly satisfactory because it is harder than 80 percent of high-class screws and bolts. For electrolytic plating sulfamate baths may be employed as described on pages 316, 317 and 318 of Metal Finishing Guide Book (1962 Finishing Publications, New York, N.Y.) If conventional electrolytic processing is employed, however, it tends to deposite a thicker layer of metal at the crests of the turns of the screw thread then near the roots of the screw thread but be repeatedly reversing the process to repeatedly thin the applied layer substantially uniform thickness of the metal plating may be approached with excellent dimensional control.

In the preferred practice of the invention, the electroless nickel process is employed as described on pages 224, 226 and 227 of the above mentioned Metal Finishing Guide Book. In the electroless process, the part to be plated is immersed in a nickel solution and the nickel in the solution is applied to the part by continuous chemical reduction without hydrogen embrittlement of the part. The deposition of the metal is carried out by turbulence and the process inherently produces a plating of uniform thickness. Since only a limited area of a screw or bolt is to be plated, the rest of the area is suitably masked. Since the turbulence is curtailed at the margin of a mask opening and especially at the corners of an angular mask opening, the plating has feathered edges. Feathered edges instead of abrupt shoulders at the edges of the plating patches are desirable. Conventional electrolytic plating also inherently avoids abrupt shoulders at the plating edges.

Figure 1:
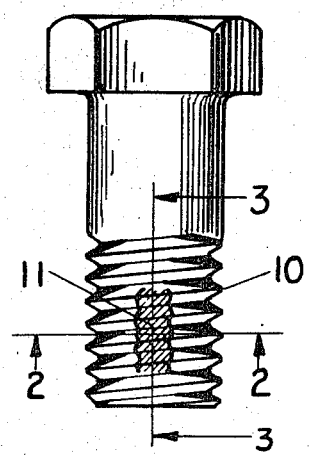
FIG. 1 is an elevational view of a bolt with a hard metal plating patch thereon as taught by the invention.
Figure 3:
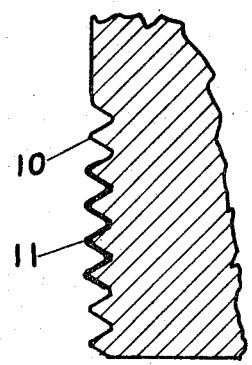
FIG. 3 is an enlarged fragmentary longitudinal sectional view of the bolt taken along the line 3–3 of FIG. 1.
Figure 2:
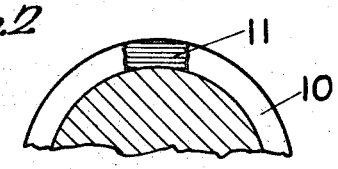
FIG. 2 is an enlarged fragmentary section taken as indicated by the line 2–2 of FIG. 1.

Referring to the drawings FIGS. 1, 2 and 3 show a conventional steel bolt having a screw thread 10 on which is deposited a nickel locking patch 11 which starts at approximately the second thread turn from the end to permit free entry of the bolt into a mating part before the locking action starts. The nickel plating that forms the locking patch 11 follows the contour of the screw thread 10 as may be seen in FIG. 3. The locking patch 11 which is elongated and is aligned longitudinally of the bolt may be of any length relative to the length of the threaded portion of the bolt.

Figure 6:
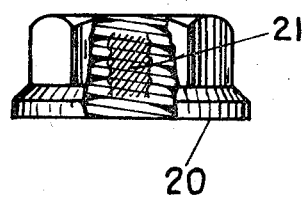
FIG. 6 is a partially cut away view of a nut with an internal locking patch.
Figure 4:
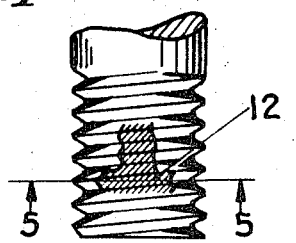
FIG. 4 is a fragmentary elevational view of a bolt with a T-shaped plating patch.
Figure 5:
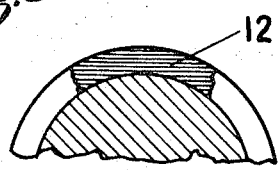
FIG. 5 is a fragmentary cross-sectional view on an enlarged scale taken as indicated by the line 5–5 of FIG. 4.

The locking patch 12 shown in FIGS. 4 and 5 is similar to the locking patch 11 but is T-shaped as shown. FIG. 6 shows a nut 20 with an elongated locking patch 21 deposited on the internal screw thread of the nut.

Figure 7:
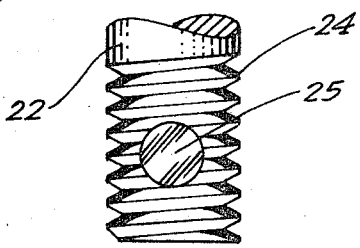
FIG. 7 is a fragmentary elevational view similar to FIG. 4 showing a circular plating patch on a bolt.

FIG. 7 shows a bolt 22 having a screw thread 24 with a circular or disc-shaped lock patch 25 applied thereto.

The width of the lock patch 11 in FIGS. 1 and 2 and the width of the patch 21 in FIG. 6 extends over approximately 25° to 30° of the circumference of the screw thread. In FIG. 4 the stem of the inverted T-shaped configuration extends over 25° to 30° of the circumference with the widest part extending over 50° to 60° of the circumference.

The diameter of the disc-shaped lock patch 25 of FIG. 4 may extend over approximately 50° to 60° of the circumference of the bolt. One advantage of providing a locking patch with an arcuate edge as shown in FIG. 7 is that when a nut is threaded onto the bolt, the various turns of the screw thread of the nut that are involved in the locking action do not encounter the edge of the patch simultaneously.

It is to be understood any suitable metal may be employed for a lock patch so long as the metal is sufficiently hard to be substantially immune to deformation by the screw thread of the mating part. For example hard copper may be employed.

The manner in which a locking patch such as shown in FIGS. 1 to 6 serves its purpose may be understood by reference to FIGS. 8, 9 and 10. FIG. 8 shows in cross section how a bolt 26 having an external screw thread 28 mates with a surrounding nut 30 having an internal screw thread 32. The threaded portion of the bolt 26 is provided with a nickel plating locking patch 34 which may be of the elongated configuration shown in FIG. 1 and which, as shown in FIG. 9, may be of a width to extend approximately 30° of the circumference of the bolt.

In FIG. 9 the inner circle 35 represents the major diameter of the screw thread 28 of the bolt 26 and the outer circle 36 represents the major diameter of the nut thread 32 and it can be seen how the locking patch 34 serves as a wedge to drive the bolt and nut into eccentric relationship, the wedging force being exerted along the diameter 38 of the bolt. The diameter intersects the lock patch 34 and diametrically opposite from the lock patch the diameter 38 intersects a frictional locking zone that is generally designated by the numeral 40 wherein the two screw threads are pressed into mutual tangential contact. It will be noted in FIG. 9 that the eccentric relationship between the bolt and the nut that is caused by the presence of the locking patch 34 creates a crescent-shaped clearance between the major diameters of the two screw threads, there being progressively tapering clearance spaces 42 on the opposite sides respectively of the locking patch.

It is apparent that the effect of the locking patch 34 is taking up the tolerance clearance between the screw and the surrounding nut varies with the radial thickness of the locking patch and varies with the circumferential extent of the locking patch. Thus in FIG. 9 the locking patch is of a given thickness and extends over an arc of 30° but if the locking patch extended over a greater arc it could be substantially thinner than the given thickness with the same effect because of the crescent-shaped clearance between the two major diameters. It is also apparent that if the locking patch 34 is of precisely uniform thickness, the two opposite shoulders 44 will be the regions of pressure contact with the surrounding thread 32 of the nut because, theoretically, there would be a minute clearance between the locking patch and the nut thread at the diameter 38.

From the foregoing it will be readily understood that two circumferentially spaced narrow locking patches may serve the same function as a single locking patch. Thus in FIG. 10 where the same dimensions of the two threads exist as in FIG. 9, two widely spaced narrow locking patches 45 and 46 serve the same purpose as the locking patch 34 in FIG. 9 but the two plating patches in FIG. 10 are substantially thinner since they are located in narrower portions of the crescent-shaped clearance between the two screw threads. Theoretically the two points of pressure against the surrounding nut thread are at the outer shoulders 45a and 46a of the two locking patches, respectively.

It has been ascertained empirically that a patch having circumferential extent on the order of 30° will serve its purpose on high class fine threaded screws throughout the whole range of tolerance clearance if the thickness of the plating lies within the range of 50 to 60 percent of the theoretical maximum tolerance clearance. For example, the table of allowances and tolerances for American and Unified screws and threaded holes, fine series UNF and NF found on page 1643 of Tool Engineers Handbook (McGraw Hill, Inc. 1949) reveals that the tolerance in pitch diameter for a ¼ inch - 28 screw is 0.0025 inch and the tolerance in pitch diameter for the corresponding Class B nut is 0.0032 inch. Therefore the theoretical maximum clearance between the thread of the screw and the thread of the nut is 0.0057 inch. Approximately half of the maximum clearance is 0.0030 inch and a satisfactory plating thickness is 0.0030 — 0.0035 inch.

If the plating thickness is reduced to 42 percent of the theoretical maximum tolerance, the torque resistance of the self-locking action will not be up to specification. On the other hand, if the thickness of the plating is increased to 67 percent of the theoretical maximum tolerance, the result will be seizure between the screw and the nut. This range of plating thickness from 50 to 60 percent of the maximum theoretical tolerance holds good for high class fine thread screws of a range of sizes up to at least 1 inch diameter. For the coarse series UNC and NC the acceptable range of plating thickness is 55—65 percent of the maximum theoretical tolerance.

At first thought it would seem that a plating thickness of only 50—60 percent of the theoretical maximum tolerance would not be sufficient to create adequate frictional resistance in the locking zone 40 in FIG. 9 when the maximum theoretical tolerance clearance exists. Part of the explanation is that since theoretically it is the two shoulders 44 of the plating 34 in FIG. 9 that create the locking pressure, less than the maximum radial dimension of the crescent-shaped clearance need be occupied by the plating because the two shoulders are spaced circumferentially from the point of maximum clearance, which point is on the diameter 38. Further explanation of the effectiveness of a relatively thin plating patch is found in the fact that a plating of a given thickness of the flank of a screw thread increases the effective pitch diameter of the screw by substantially more than the thickness of the plating. This fact may be understood by reference to FIG. 11 where the pitch circumference is indicated by the broken line 48 and the thickness of the metal plating is designated $a$. The plating thickness increases the effective pitch diameter by the dimension $b$ which is measured perpendicularly of the axis of the screw. By virtue of this sine relationship, if the thickness dimension $a$ is 0.003 inch, the dimension $b$ will be approximately 0.005 inch. Thus the circumferential extent of the plating patch combined with the increase of the effective pitch diameter by the plating patch combine to account for the fact that a plating thickness of only half the maximum tolerance is capable of taking up the whole maximum tolerance to create the desired self-locking action.

It is obvious that if a plating patch extending over 30° of the circumference of the screw thread and having a thickness of only 50—60 percent of the maximum theoretical tolerance serves the purpose of the invention, a plating patch extending over a substantially larger arc may be substantially thinner to serve the same purpose.

With the thickness of the plating selected to account for the maximum theoretical pitch tolerance between the screw and the nut, a total clearance of slightly less than the theoretical maximum will create more pressure across the diameter 38 in FIG. 9 and the fact that the clearance is slightly less than the theoretical maximum will be compensated for by the fact that mutual polishing or lapping of the mating screw threads will occur in the locking zone 40 with consequent minor increase in the clearance. This fact may be understood when it is considered that a hole drilled in steel has a finish of RMS 125-—250 and when the drilled hole is tapped, the die reduces the RMS to approximately 62. After initial friction between the plated screw and the nut, the RMS finish 62 in the locking zone is reduced to approximately RMS 20 by compressive deformation of the metal surface, the threads in effect being lapped by the mutual sliding pressure contact.

If the actual total clearance at the pitch diameter is substantially less than the theoretical maximum tolerance, the wedge effect of the metal patch will cause the nut to yield elastically to the general configuration of an ellipse with the major axis of the ellipse coinciding with the diameter 38 in FIG. 9. An important feature of the invention is that the two tapering clearance spaces 42 in FIG. 9 on opposite sides of the plating patch provide room for inward elastic flexure of the nut. Thus the nut yields elastically both in tension and in flexure. Even if the theoretical minimum of zero tolerance exists, the nut will yield elastically to compensate for the lack of clearance and will do so without causing either galling or seizure. It is to be emphasized that the hardness of the plating patch is essential to prevent galling and seizure under this extreme condition. It is true that under the extreme condition of zero total clearance the arcuate extent of the locking zone 40 in FIG. 9 is increased by the elastic deformation of the nut but, nevertheless, neither galling or seizure occurs. In a typical test of a fine thread ¼ inch - 28 Class 3A screw and complementary Class 3B nut carried out through 15 cycles the installation torque on the first cycle was 57-inch pounds and the breakaway torque 55-inch pounds. On the 15 cycle, the on torque dropped only to 30 pounds and the breakaway torque dropped only to 34 pounds. Thus the test amply meets the military requirement that the maximum on torque not exceed 60-inch pounds and the minimum off torque be at least 7-inch pounds over the 15 cycles of the test.

FIG. 12 shows how the procedure of providing a screw 48 with a plating lock patch may be carried out by first placing an adhesive masking disc 50 on the screw and then enveloping the screw and masking disc with a resist coat 52. The masking disc 50 is then removed to expose a corresponding area of the screw thread for a plating operation. The screw with the resist coat thereon may then be immersed in a nickel composition bath for disposition of the plating either by a conventional electrolytic process or by the electroless process.

FIG. 13 illustrates in an alternate procedure wherein a long bar 54 of a suitable plastic is divided longitudinally into two separate halves 54a and 54b and has a plurality of longitudinally spaced blind tapped bores 55 to receive corresponding screws 56, one half of each bore being formed in each of the two sections 54a and 54b. The section 54b of the bar is provided with a corresponding number of flared lateral openings 58 that expose the desired areas of the screws 56 to the action of a nickel compensation 60 in which the bar is partially immersed. In the construction shown, the two sections 54a and 54b of the bar are releasably held together by the two jaws of a clamp 60. The clamp is of a well known construction in which a compression spring 62 acts between the two jaws of the clamp to keep the two sections of the bar 54 under pressure. Ten such bars 54 each with a capacity of one hundred ¼ inch screws make it possible to plate one thousand screws at a time. Approximately 4 hours is required for electroless plating of the screws but only 20 minutes is required for electrolytically plating the screws with a sulfamate bath.

My description in specific detail of the preferred practice of the invention will suggest various changes, substitutions and other departures from my disclosure within the spirit and scope of the invention.

I claim:

1. A threaded metal fastening member for screw-threaded cooperation with a mating threaded part having a plating of hard metal localized of the threaded portion thereof, the plating being of a circumferential extent of less than 180° and being of a thickness sufficient to force the opposite side of the threaded portion into pressure contact with the mating part for frictional self-locking cooperation therewith, the metal of the plating being harder than that of the mating threaded part.

2. A fastening member as set forth in claim 1 in which the plating is a nickel plating.

3. A fastening member as set forth in claim 1 in which the plating extends over a plurality of turns of the screw thread of the member.

4. In a metal fastener assembly wherein a first inner fastener member has an external screw thread and a second outer fastener member has an internal screw thread to engage the external screw thread, the improvement for self-locking action of the two screw threads, comprising:
   plating extending over a minor portion of the circumference of one of the two screw threads to force the two members into eccentric relationship to force the two screw threads into mutual tangential contact in a friction locking zone diametrically opposite from the plating when the tolerance clearance between the two screw threads is maximum; and
   said plating being of a metal hard enough to be substantially invulnerable to deformation by the screw thread of the other of the two members to cause the outer fastener member to deform elastically to the general configuration of an ellipse to compensate for less than the maximum tolerance clearance.

5. An improvement as set forth in claim 4 in which said plating comprises two circumferentially spaced deposits of plating within said minor portion of the circumference.

6. In a metal screw member having an external screw thread to engage an internal screw thread of a complementary member, the improvement for self-locking action of the two members, comprising:
   plating extending over a minor portion of the circumference of said external screw thread of a thickness to force the two members into eccentric relationship to force the two screw threads into mutual tangential contact in a friction locking zone diametrically opposite from the plating when the tolerance clearance between the two screw threads is maximum; and
   said plating being of a metal hard enough to be substantially invulnerable to deformation by the screw thread of the other of the complementary member to cause the complementary member to deform elastically to the general configuration of an ellipse to compensate for less than the maximum tolerance clearance.

7. In a metal fastener assembly wherein a screw member has an external screw thread and a complementary nut member has an internal screw thread to engage the external screw thread with a given range of tolerance clearance between the two screw threads, the improvement for self-locking action of the two screw threads, comprising:
   a plating deposit on one of the two screw threads of a circumferential extent of substantially less than 180° to force the two members into eccentric relationship;
   said plating deposit being a metal of sufficient hardness to be substantially invulnerable to deformation by the other of the two screw threads; and
   said plating deposit being of a thickness to compensate for the maximum clearance in said range to force the two screw threads into mutual contact in a frictional locking zone diametrically opposite from the plating deposit when the clearance between the two screw threads is at said maximum, whereby compensation for the clearance being only slightly less than said maximum is provided at least in part by mutual frictional polishing of the two screw threads and compensation for the clearance being greatly less than said maximum is provided in part by elastic deformation of the nut member into the configuration of an ellipse with the major axis of the ellipse intersecting said frictional locking zone.

8. An improvement as set forth in claim 7 in which the plating is on the external screw thread of the screw member.

9. An improvement as set forth in claim 7 in which the plating is on the internal screw thread of the nut member.

10. An improvement as set forth in claim 7:
   in which the two members are high class threaded members with fine threads; and
   in which the thickness of the plating is based on the relationship of a thickness of 50—60 percent of said maximum clearance when the effective circumferential extent of the patch is on the order of 20°—40°, the thickness varying inversely with the circumferential extent of the patch.

11. An improvement as set forth in claim 7:
   in which the two members are high class threaded members with coarse threads; and
   in which the thickness of the plating is based on the relationship of a thickness of 55—65 percent of said maximum clearance when the effective circumferential extent of the patch is on the order of 20°—40°, the thickness varying inversely with the circumferential extent of the patch.

12. A method of fabricating a first screw-threaded fastening member for self-locking engagement with a second complementary screw threaded fastening member, characterized by the step of:
   plating a minor area of the threaded portion of the first fastening member on one side thereof of a circumferential extent of substantially less than 180° with a hard metal of a thickness sufficient to force the opposite side of the threaded portion into pressure engagement with the second fastening member for frictional self-locking cooperation therewith when the tolerance clearance between the two members is at maximum whereby the outer of the two fastening members elastically deforms in configuration to compensate for clearance tolerances of substantially less than said maximum, the metal of the plating being harder than that of the second fastening member.

13. A method of fabricating a first screw threaded fastening member for self-locking engagement with a second complementary screw threaded fastening member, characterized by the steps of:
   applying a mask to a minor area of the threaded portion of the fastening member on one side thereof of a circumferential extent of substantially less than 180°;
   enveloping the first fastening member with a resist coat;
   removing the mask to expose said minor area; and
   immersing the fastening member in a bath to deposit on said area a hard metal plating of a thickness to force the opposite side of the fastening member into pressure contact with the second fastening member for frictional self-locking cooperation therewith when the tolerance clearance between the two fastening members is at the maximum whereby the outer of the two fastening members elastically yields to a generally elliptical configuration to compensate for tolerance clearances between the two members of less than said maximum.

14. A method of fabricating a first screw thread fastening member for self-locking engagement with a second complementary screw threaded fastening member characterized by the steps of:
   providing a plastic holder for the first screw threaded fastening member with the holder masking the threaded portion of the first fastening member except for a minor area on one side of the fastening member of a circumferential extent of substantially less than 180°; and
   immersing the holder in a bath for deposit on said minor area of the fastening member of a metal plating of a thickness to force the opposite side of the first fastening member into pressure contact with the second fastening member for frictional self-locking cooperation therewith when the tolerance clearance between the two fastening members is at the maximum whereby the outer of the two fastening members elastically yields to a generally elliptical configuration to compensate for tolerance clearances between the two members of less than said maximum.